(12) United States Patent
Hsu et al.

(10) Patent No.: US 10,995,901 B2
(45) Date of Patent: May 4, 2021

(54) UTILITY VEHICLE WITH DEPLOYABLE PLATFORM

(71) Applicant: HONDA MOTOR CO., LTD., Tokyo (JP)

(72) Inventors: Ricky Jukuei Hsu, Rancho Palos Verdes, CA (US); Yimeng Li, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 16/389,531

(22) Filed: Apr. 19, 2019

(65) Prior Publication Data
US 2020/0332949 A1 Oct. 22, 2020

(51) Int. Cl.
| *F16M 11/32* | (2006.01) |
| *B62D 63/02* | (2006.01) |
| *E04H 15/02* | (2006.01) |
| *B60K 7/00* | (2006.01) |
| *F16M 11/20* | (2006.01) |

(Continued)

(52) U.S. Cl.
CPC ............. *F16M 11/32* (2013.01); *B60G 17/00* (2013.01); *B60K 7/0007* (2013.01); *B60P 1/00* (2013.01); *B62D 63/02* (2013.01); *E04H 15/02* (2013.01); *F16M 11/2021* (2013.01)

(58) Field of Classification Search
CPC .... F16M 11/32; F16M 11/2021; B60G 17/00; B60K 7/0007; B60P 1/00; B60P 1/64; B60P 1/48; B60P 1/34; B60P 1/6409; B60P 1/6418; B60P 3/025; B60P 3/0252; B60P 3/0255; B60P 3/0257; B60P 3/14; B60P 3/32; B60P 3/34; B60P 3/38; B60P 3/39; B60P 9/00; B62D 63/02; B62D 63/06; B62D 63/061; B62D 63/062; B62D 63/064; B62D 63/025; B62D 59/02; B62D 59/04; B62D 59/00; B62D 21/12; B62D 21/14; B62D 33/0207; B62D 33/0215; E04H 15/04; E04H 15/02; B60L 2200/28; B66F 11/04
See application file for complete search history.

(56) References Cited

U.S. PATENT DOCUMENTS 2,204,432 A    6/1940   Morgadanes
4,786,073 A * 11/1988   Harper ................ B62D 63/061
                                                                    280/491.1

(Continued)

FOREIGN PATENT DOCUMENTS

CN       104453344 A     3/2015
CN       205224803 U     5/2016

*Primary Examiner* — Glenn F Myers
(74) *Attorney, Agent, or Firm* — Arent Fox LLP

(57) ABSTRACT

The disclosure provides an electric utility vehicle with detachable platform. The electric utility vehicle may include a load platform supported on a chassis including at least two electrically driven wheels. The detachable platform may be removeably coupled to the load platform. The detachable platform may include a central hub including a top surface. The detachable platform may include three legs coupled to the central hub, each leg including an actuator configured to extend the respective leg to a ground surface while the detachable platform is coupled to the load platform. The detachable platform may include a controller configured to coordinate the actuators to control an orientation of the top surface.

15 Claims, 8 Drawing Sheets

(51) Int. Cl.
  *B60P 1/00*   (2006.01)
  *B60G 17/00*  (2006.01)

(56) References Cited

U.S. PATENT DOCUMENTS

| | | | |
|---|---|---|---|
| 5,387,071 A * | 2/1995 | Pinkston | B60P 3/125 |
| | | | 212/232 |
| 7,278,507 B2 | 10/2007 | Walworth | |
| 2009/0179455 A1 | 7/2009 | Ogden | |
| 2016/0001832 A1* | 1/2016 | Beiler | B62D 21/20 |
| | | | 414/550 |
| 2018/0050626 A1* | 2/2018 | Delp | G06Q 50/30 |
| 2018/0111540 A1 | 4/2018 | Van Bebber et al. | |
| 2019/0118696 A1* | 4/2019 | McGregor | B60P 3/42 |
| 2019/0176911 A1* | 6/2019 | Beitzen-Heineke | |
| | | | B60K 7/0007 |
| 2020/0231233 A1* | 7/2020 | Linkletter | B62D 63/061 |

* cited by examiner

UTILITY VEHICLE WITH DEPLOYABLE PLATFORM

TECHNICAL FIELD

The subject matter disclosed herein relates to all-terrain vehicles and, more particularly, to an electric quad vehicle that may be deployed from another vehicle.

BACKGROUND

All-terrain vehicles or four-wheelers may be used for a variety of recreational and utility purposes. Such vehicles typically have a relatively limited range compared to larger passenger vehicles. Further, such vehicles may be prohibited from driving on roadways. Accordingly, a person wishing to drive an all-terrain vehicle may need to transport the all-terrain vehicle to a recreational location. Conventional all-terrain vehicles may be bulky and may be transported in a pickup truck or in a trailer.

In view of the foregoing, a quad vehicle that is easier to transport than conventional all-terrain vehicles may be desirable. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides an electric utility vehicle. The electric utility vehicle may include a load platform supported on a chassis including at least two electrically driven wheels. The electric utility vehicle may include a detachable platform removeably coupled to the load platform. The detachable platform may include a central hub including a top surface. The detachable platform may include three legs coupled to the central hub, each leg including an actuator configured to extend the respective leg to a ground surface while the detachable platform is coupled to the load platform. The detachable platform may include a controller configured to coordinate the actuators to control an orientation of the top surface.

In an aspect, the disclosure provides a method of deploying a platform by a utility vehicle. The method may include driving the utility vehicle to a deployment location with the platform stored on the utility vehicle in a retracted state. The method may include extending, by actuators of the platform, a plurality of legs from the platform to a ground surface. The method may include driving the utility vehicle away from the deployment location while leaving the platform at the deployment location.

In another aspect, the disclosure provides a deployable platform. The deployable platform may include a central body including a top surface. The deployable platform may include three legs coupled to the central hub, each leg including an actuator configured to extend the respective leg to a ground surface while the detachable platform is coupled to a deployment vehicle. The deployable platform may include a controller configured to coordinate the actuators to control an orientation of the top surface.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
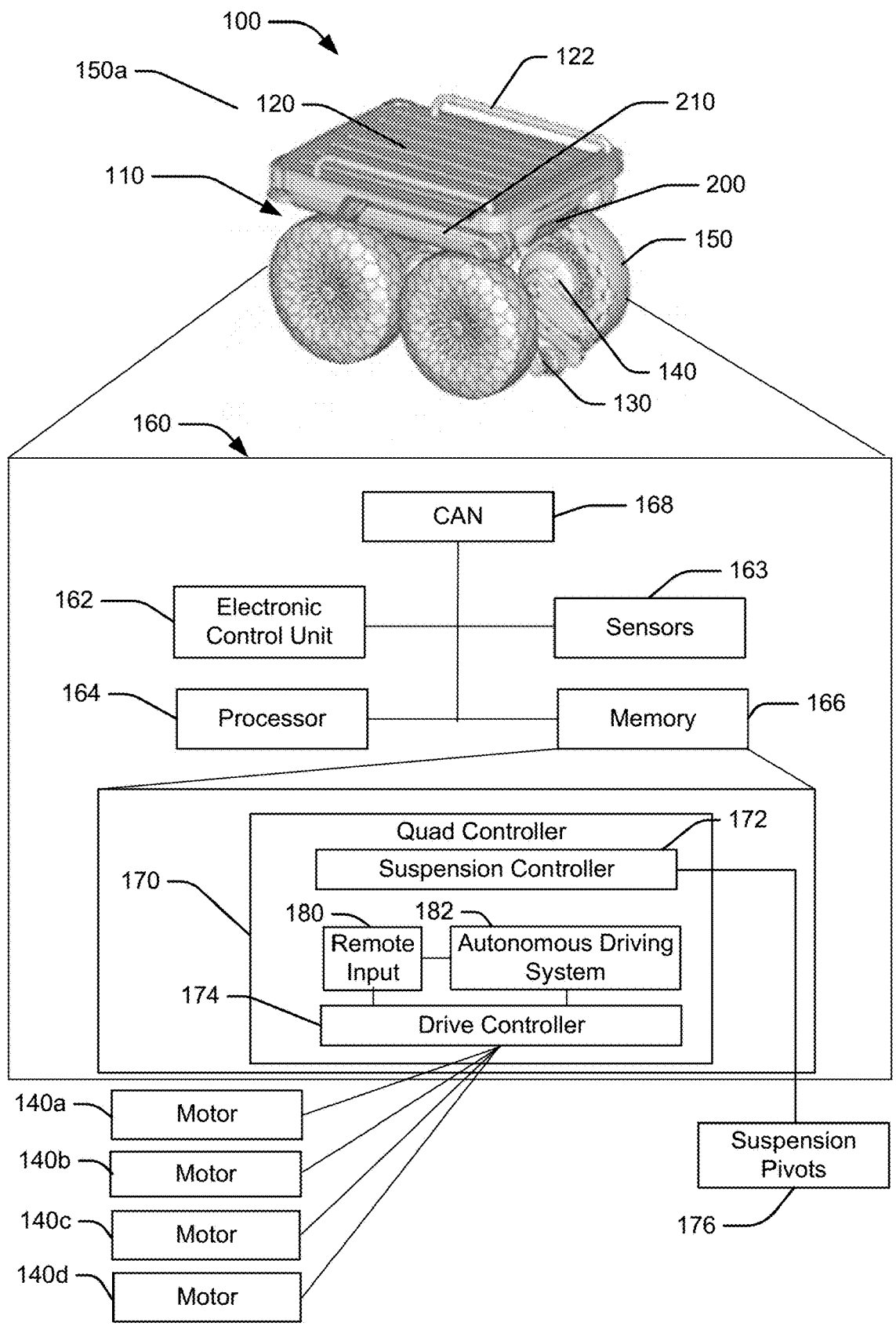
FIG. 1 illustrates a schematic view of an example quad vehicle in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

The term "graphical user interface," "GUI," or "user interface," as used herein, can refer to a type of interface that allows users to interact with electronic devices, the vehicle system, the vehicle, vehicle applications or the like, through graphical icons, visual indicators such as secondary notation, text-based, type command labels, text navigation, and the like.

The term "screen," "display screen," or "display," as used herein, can refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like.

In an aspect, the present disclosure provides an electric utility vehicle with a retractable suspension that allows the quad vehicle to be stored and/or transported in a smaller space. For example, the quad vehicle may be stored within a passenger vehicle in a retracted state and deployed at a destination into an expanded state. Additionally the utility vehicle may include a detachable platform that may be deployed from the utility vehicle. The detachable platform may include folding legs that support the platform while the utility vehicle performs other tasks. The detachable platform may support an electric appliance.

Turning to FIG. 1, an example utility vehicle 100 is schematically illustrated. The utility vehicle 100 may include a chassis 110 that pivotably couples four legs 130 (130a, 130b, 130c, 130d). The chassis 110 may support a platform 120 that extends over the chassis 110 and supports a load (not shown). The platform 120 may include a generally flat top surface. The top surface may include ridges, grooves, or other textures. The platform 120 may include rails 122, which may be used to anchor the load. The platform 120 may store a deployable platform 200 that may be positioned, for example, beneath the top surface of the platform 120. The deployable platform 200 may include legs 210 that may be extended downward when the deployable platform 200 is deployed.

In an aspect, the utility vehicle 100 is an electric utility vehicle. The chassis 110 may include a power supply such as a battery or fuel cell. The power supply may provide electric current for controlling a rotary suspension and for powering electric drive motors 140. The quad vehicle 100 may include a vehicle control system 160 that controls power distribution and control signals.

The example quad vehicle 100 may include a rotary suspension including the four legs 130a, 130b, 130c, 130d. Each leg 130 may pivot vertically with respect to the chassis 110. The pivots may be biased to rotate the legs in a downward direction. That is, the forward legs 130a, 130b may be biased to rotate counter-clockwise when viewed from the outside, and the rear legs 130c, 130d may be biased to rotate clockwise when viewed from the outside. In an aspect, the biasing force may be supplied or adjusted electronically by the vehicle control system 160. For example, each pivot may include an electro-magnetic actuator that biases the respective leg downward. The biasing force may be adjusted for the weight of the load. Additionally, in an aspect, the biasing force may be dynamically adapted to absorb shocks, for example, due to uneven terrain. The biasing force may also be adapted based on steering controls to allow the utility vehicle 100 to remain level during turns.

Each leg 130 may include a respective electric motor 140 that drives a respective wheel 150. The electric motor 140 may be located at the end of the leg 130. In an aspect, the electric motor 140 may be a hub motor that resides within the respective wheel 150. The four electric motors 140a, 140b, 140c, 140d and respective wheels 150a, 150b, 150c, 150d, may provide all-wheel drive and all-wheel steering for the utility vehicle 100. As discussed in further detail below, the vehicle control system 160 may individually control each of the motors 140 to drive the respective wheel 150. Accordingly, power may be distributed to effectively propel the utility vehicle 100. Additionally, the all-wheel steering may operate without mechanical turning of the wheels 150. By driving the wheels 150 at different speeds, the utility vehicle 100 may be turned in the direction of the slower wheels 150. In an aspect, for example, the utility vehicle 100 may perform a stationary turn by driving wheels 150a and 150c in one direction and driving the wheels 150b and 150d in the opposite direction.

The vehicle control system 160 may reside within the vehicle 100. The components of the vehicle control system 160, as well as the components of other systems, hardware architectures, and software architectures discussed herein, may be combined, omitted or organized into various implementations.

The vehicle control system 160 may generally include an electronic control unit (ECU) 162 that operably controls a plurality of vehicle systems. The vehicle systems may include, but are not limited to a suspension control system, a steering control system, an acceleration control system, and the like. The vehicle systems may include sensors 163 such as cameras, accelerometers, radar, lidar, etc. The vehicle control system 160 may also include a processor 164 and a memory 166 that communicate with the ECU 162, and controller area network (CAN) 168.

The ECU 162 may include internal processing memory, an interface circuit, and bus lines for transferring data, sending commands, and communicating with the vehicle systems. The ECU 162 may include an internal processor and memory, not shown. The vehicle 100 may also include a bus for sending data internally among the various components of the vehicle control system 160.

The memory 166 may store instructions executable by the processor 164 for carrying out the methods described herein. Further, the memory 166 may store parameters for carrying out the methods described herein. For example, the memory 166 may store a quad controller 170, which may include software executable by the processor 164 for operating the vehicle control system 160. The quad controller 170 may also include a suspension controller 172 for controlling suspension pivots 176 of the rotary suspension and a drive controller 174 for controlling the motors 140. In an aspect, the drive controller 174 may generate motor control signals based on one or more of a remote input 180 and an autonomous driving system 182. The remote input 180 may receive input from an operator via a remote control or mobile device. For example, a remote control may allow the operator to input acceleration and steering commands that allow the operator to drive the utility vehicle 100. In another aspect, the autonomous driving system 182 may control the acceleration and steering of the utility vehicle 100. An operator may provide higher level commands such as selection of a destination or a task, and the autonomous driving system may plan a route and acceleration and steering commands to follow the planned route. In an aspect, the operator may access the autonomous driving system via a mobile device at a location remote from the utility vehicle 100.

Figure 2:
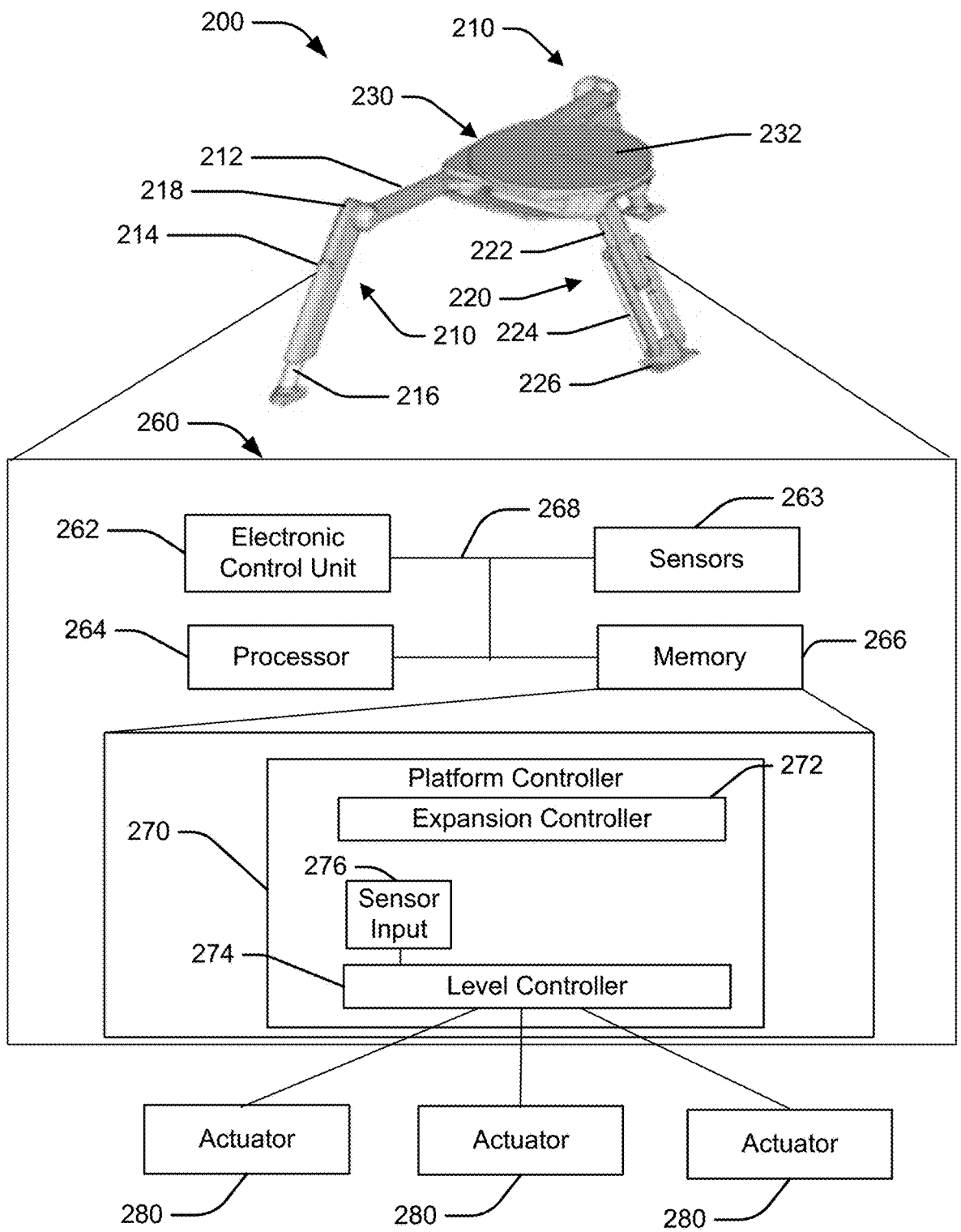
FIG. 2 illustrates a schematic view of an example detachable platform.

FIG. 2 is a schematic diagram of the example deployable platform 200. The deployable platform 200 includes two side legs 210 and a center leg 220 supporting a body 230 having a flat top surface 232. The legs 210, 220 may be folded into and alongside the body 230 in an undeployed state. In a deployed state, the legs 210, 220 may be extended downward to contact a ground surface and support the body 230 above the ground surface.

The side legs 210 may each include an upper segment 212, a middle segment 214, and a lower segment 216. The upper segment 212 may be pivotably coupled to the body 230. For example, the upper segment 212 may pivot in a horizontal plane (e.g., about a vertical post located in the body 230). In an aspect, a linear actuator within the body 230 may control the movement of the upper segment 212. The middle segment 214 may be pivotably coupled to the upper segment 212 at a joint 218. For example, the middle segment 214 may pivot in a vertical plane (e.g., about a horizontal post located at an end of the upper segment 212). In an aspect, the joint 218 may include an electro-magnetic actuator that biases the middle segment 214 downward. The lower segment 216 may telescopically extend from the middle segment 214. In an aspect, the lower segment 216 may be driven by, for example, a linear actuator or screw drive to adjust the length of the lower segment 216 extending from the middle segment 214.

The center leg 220 may fold into a central cavity in the underside of the body 230. For example, the center leg 220 may include an upper segment 222, a lower segment 224, and a foot 226. The upper segment 222 may be pivotably mounted toward a front of the platform and pivot in a substantially vertical plane. The lower segment 224 may be pivotably and/or slidably mounted to the upper segment 222. For example, as illustrated, the lower segment 224 may include two rods mounted to each side of the upper segment 222. The two rods may retain an end of the upper segment 222 therebetween. A worm gear system may slide the lower segment 224 relative to the upper segment 222. Additionally, or alternatively, an electro-magnetic actuator may cause the lower segment 224 to pivot with respect to the upper segment 224 in a similar manner as the side legs 210. The foot 226 may be pivotably mounted to the lower end of the lower segment 224 and provide a flat contact surface for contacting the ground.

The deployable platform 200 may include a platform control system 260 that may reside within the platform 200 and operate to deploy the platform 200. The components of the platform control system 260, as well as the components of other systems, hardware architectures, and software architectures discussed herein, may be combined, omitted or organized into various implementations.

The platform control system 260 may generally include an electronic control unit (ECU) 262 that operably controls the platform 200. The platform control system 260 may also include a processor 264 and a memory 266 that communicate with the ECU 162 via a bus 268.

The ECU 262 may include internal processing memory, an interface circuit, and bus lines for transferring data, sending commands, and communicating with platform components. The ECU 262 may include an internal processor and memory, not shown. The bus 268 may sending data internally among the various components of the platform control system 260.

The memory 266 may store instructions executable by the processor 264 for carrying out the methods described herein. Further, the memory 266 may store parameters for carrying out the methods described herein. For example, the memory 266 may store a platform controller 270, which may include software executable by the processor 264 for operating the platform control system 260. The platform controller 270 may also include an expansion controller 272 for controlling the legs 210, 220 to extend to the ground and a level controller 274 for controlling orientation of the platform 200 once deployed.

Figure 3:
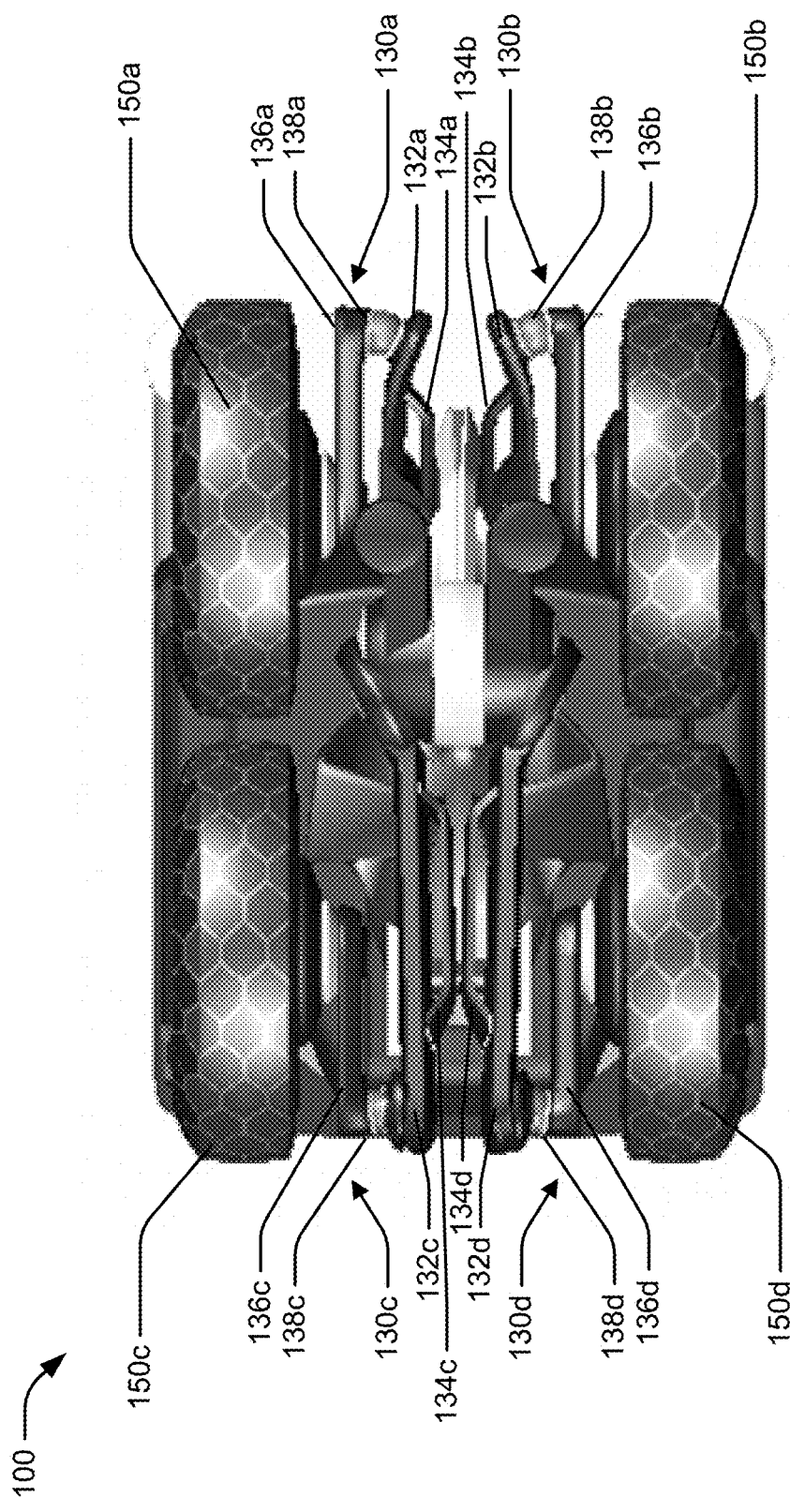
FIG. 3 illustrates a bottom view of the example quad vehicle showing a suspension system in accordance with aspects of the present disclosure.

FIG. 3 illustrates a bottom view of the example utility vehicle 100 including a suspension system. An example structure of the legs 130 can be seen. A forward leg 130a may include a first segment 132a coupled to the chassis 110 at a pivot 136a. The first segment 132a may also include a support 134a that extends parallel to the first segment 132a. The support 134a may allow the first segment 132a a limited degree of lateral flexibility. The support 134a may also support a joint 138a at which a second leg segment 136a is coupled to the first segment 132a. In an aspect, for example, the joint 138a may be a locking ball joint that allows the second leg segment 136a to rotate vertically and horizontally with respect to the first segment 132a. The joint 138a may be locked in various positions, for example, in the extended position and the retracted position. A second forward leg 130b may mirror the forward leg 130a and include include a first segments 132b, support 134b, second leg segment 136b and joints 138b.

The rear legs 130c, 130d may be similar to forward legs 130a, 130b and include first segments 132c, 132d, supports 134c, 134d, second leg segments 136c, 136d, and joints 138c, 138d. In an aspect, the first segment 132c may be longer than the first segment 132a to keep the load centered over the wheelbase.

In an aspect, the utility vehicle 100 may transition between an extended state and a retracted state. In the extended state, the first leg segments 132 may be pivoted horizontally outward and vertically down from the chassis 110. The second leg segments 136a, 136b may be rotated about the joints 138 to extend forward, and the second leg segments 136c, 136d may be rotated about the joints 138 to extend rearward. Accordingly, the utility vehicle 100 may have a wide wheel base in the extended state.

In an intermediate state, the second leg segments 136 may be rotated toward a vertical position. In an aspect, for example, the motors 140 may be driven to exert an upward rotational force on the second leg segments 136. For example, the front wheels 150a, 150b may be driven in reverse while the rear wheels 150c, 150d may be driven forward. Additionally, the first leg segments 132 may be pivoted horizontally inward at the chassis 110. Further, the first leg segments 132 may be pivoted vertically upward at the chassis 110. The overall height of the vehicle 100 or platform 120 may not change significantly between the extended state and the intermediate state because the vertical orientation of the second leg segments 136 may offset the vertical rotation of the first leg segments 132.

Transitioning into the retracted state, the second leg segments 136a, 136b may be rotated to extend rearward from the joints 138a, 138b, and the second leg segments 136c, 136d may be rotated to extend forward from the joints 138c 138d. For example, the front wheels 150a, 150b may be driven in reverse while the rear wheels 150c, 150d may be driven forward. When the vehicle 100 is in the retracted state, each leg 130 may be in a retracted position with each of the joints 138 may be bent at an acute angle, which may reduce a total length of the leg 130 and bring the wheel adjacent to the chassis 110. The platform 120 may be lowered as the second leg segments 136 rotate away from the vertical orientation. The first leg segments 132 may be further pivoted horizontally inward to a longitudinal orientation. In an aspect, the wheels 150 on each side may be separated by a small distance (e.g., 1-5 cm) to allow rotation. In the retracted state, the utility vehicle 100 may be driven over relatively level surfaces as the movement of the suspension may be limited.

Transition from the retracted state to the extended state may be the reverse of the transition from the extended state to the retracted state. For example, the front wheels 150a, 150b may be driven forward while the rear wheels 150c, 150d may be driven in reverse to rotate the second leg segments 136 toward a vertical orientation, then toward the chassis 110. The first leg segments 132 may be pivoted horizontally outward at the chassis 110. Further, the first leg segments 132 may be pivoted vertically downward at the chassis 110.

Figure 4:
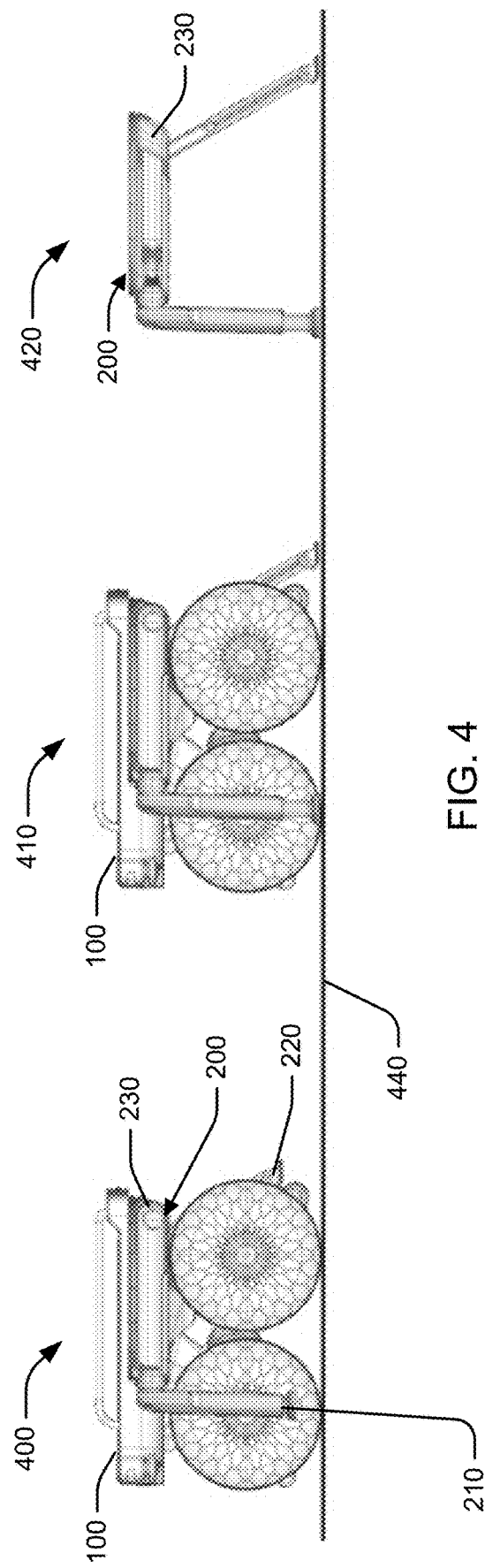
FIG. 4 illustrates a side of the example electric utility vehicle deploying the example detachable platform, in accordance with aspects of the present disclosure.

FIG. 4 illustrates deployment of the deployable platform 200 from the utility vehicle 100. The platform 200 may be fully retracted (as illustrated in FIG. 1) when the utility vehicle 100 is in a travel state. In a deployment state 400, the side legs 210 may be pivoted outward at the upper segment 212 and downward at the middle segment 214. The lower segment 216 may remain retracted within the middle segment 214. The center leg 220 may be extended downward, but may not contact the ground 440. In the deployment state 410, the lower segments 216 may be extended until the lower segments 216 contact the ground 440. On uneven terrain, the lower segments 216 may be extended different distances to contact the ground 440. Additionally, in deployment state 410, the center leg 220 may be pivoted downward until the foot 226 contacts the ground 440. In deployment state 420, the vehicle 100 may back away from the platform 200, leaving the platform 200 at a deployment location supported on the ground 440. The vehicle 100 may perform other tasks while the platform 200 is deployed (e.g., carrying additional cargo to another location).

Figure 5:
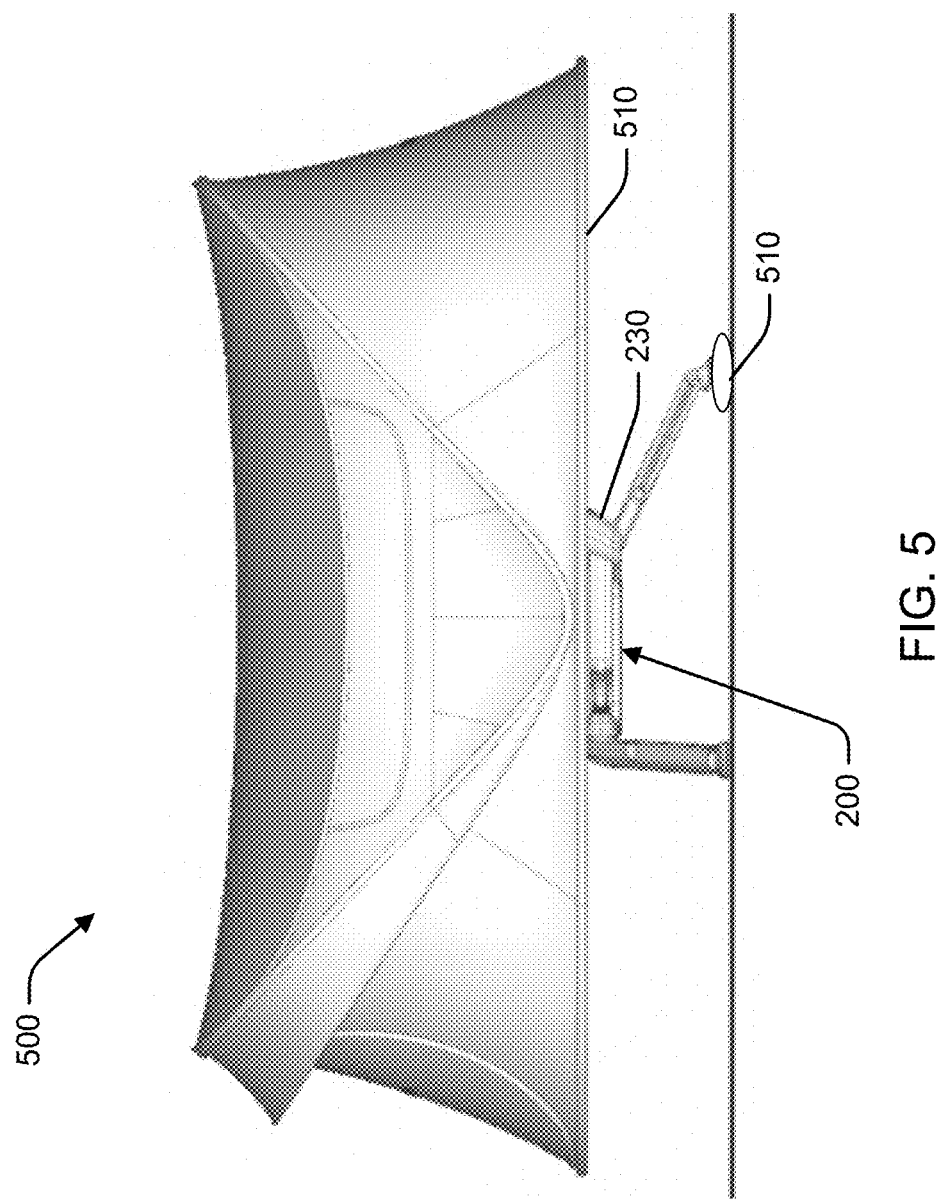
FIG. 5 illustrates a side view of the example detachable platform supporting an example electrical appliance, in accordance with aspects of the present disclosure.

FIG. 5 illustrates an example use of the platform 200 to support an appliance 500. In this example, the appliance 500 may be a collapsible tent. The tent may be stored within the platform 200 and be expanded when the platform 200 is deployed. In an aspect, the appliance 500 may be an electric appliance. For example, the collapsible tent may include electric lighting or a sound system. The appliance 500 may draw power from a power supply of the platform 200. In the example of the collapsible tent, the body 230 may be smaller than the tent floor 510. In an aspect, the body 230 may expand horizontally support the tent floor 510. For example, the body 230 may include a plurality of folded panels that may be unfolded and locked in an expanded configuration. For instance, an actuator may be electronically controlled to unfold the folded panels (e.g., by straightening a hinge) and lock the panels in the unfolded state. In another example, the tent floor 510 may include a dynamic material that may become more rigid when an electric current is applied.

The platform 200 may maintain the body 230 and any supported appliance in a desired orientation. Generally, the desired orientation may be a level orientation, but sloped orientations may be desirable for various appliances. The platform 200 may periodically determine a current orientation. For example, the sensor input 276 may include input from sensors 263 such as one or more accelerometers that determine the orientation of the platform 200. The level controller 274 may then control the actuators in the legs 210, 220 to bring the platform 200 to the desired orientation.

Figure 6:
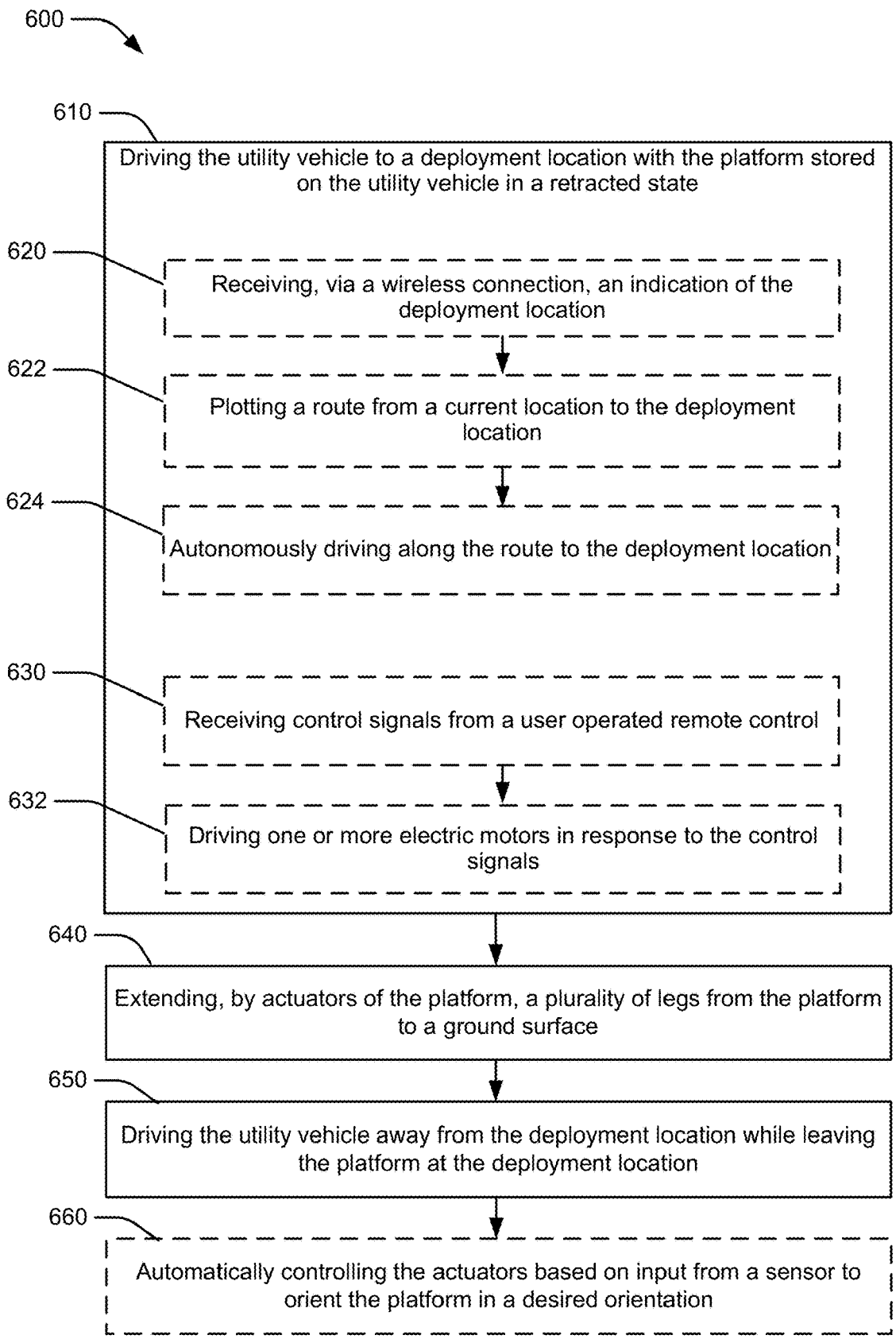
FIG. 6 is a flowchart of an example method of controlling a seating arrangement of vehicle in accordance with aspects of the present disclosure.

FIG. 6 illustrates a flowchart of an example method 600 for deploying a platform from a utility vehicle. The method 600 may be performed by a vehicle control system 160 of the utility vehicle 100 in combination with the platform control system 260 of a platform 200.

In block 610, the method 600 may include driving the utility vehicle to a deployment location with the platform stored on the utility vehicle in a retracted state. In an aspect, for example, the quad controller 170 of the vehicle control system 160 may drive the utility vehicle 100 to the deployment location with the platform 200 stored on the utility vehicle 100 in the retracted state.

In an aspect, the quad controller 170 may operate autonomously utilizing the autonomous driving system 182. For example, at sub-block 620, the block 610 may include receiving, via a wireless connection, an indication of the deployment location. In an aspect, the remote input 180 (e.g., a wireless modem) may receive the indication of the deployment location. For instance, a remote user may select the deployment location on a mobile device using a vehicle control application that displays a map of the area surrounding the vehicle 100 and allows the remote user to select the deployment location. In sub-block 622, the block 610 may include plotting a route from a current location to the deployment location. In an aspect, for example, the autonomous driving system 182 may plat the route from the current location to the deployment location. For example, the autonomous driving system 182 may select portions of predefined routes (e.g., roads or trails). Where no predefined route to the deployment location is available, the autonomous driving system 182 may utilize topographical map information to plot a route that the vehicle 100 may traverse. For example, the autonomous driving system may plot a route that is free of obstacles and may seek to minimize distance and elevation change. The route may include a series of waypoints. In sub-block 624, the block 610 may include autonomously driving along the route to the deployment location. In an aspect, for example, the autonomous driving system 182 may drive the vehicle 100 along the route to the deployment location. For example, the autonomous driving system 182 may provide acceleration and steering signals to navigate between waypoints of the plotted route to the drive controller 174. The drive controller 174 may generate control signals for each of the motors 140 to drive the vehicle 100 along the route.

In another aspect, the quad controller 170 may operate under more direct control of an operator. For example, the operator may utilize a remote control to drive the vehicle 100. The remote control may be a mobile device or a specialized remote for the vehicle 100. In sub-block 630, the block 610 may include receiving control signals from a user operated remote control. In an aspect, for example, the remote input 180 may receive the control signals from the user operated remote control. In sub-block 632, the block 610 may include driving one or more electric motors in response to the control signals. In an aspect, for example, the quad controller 172 may execute the drive controller 174 to drive the one or more electric motors 140 in response to the control signals.

In block 640, the method 600 may include extending, by actuators of the platform, a plurality of legs from the platform to a ground surface. In an aspect, for example, the platform controller 270 may execute the expansion controller 272 to activate one or more of actuators 280 to extend the legs 210, 220 from the body 230 of the platform 200 to the ground 440.

In block 650, the method 600 may include driving the utility vehicle away from the deployment location while leaving the platform at the deployment location. In an aspect, for example, the quad controller 170 of the vehicle control system 160 may drive the utility vehicle 100 away from the deployment location while leaving the platform 200 at the deployment location. As discussed above with respect to block 610, the driving may be performed autonomously, or by an operator using a remote control.

In block 660, the method 600 may include automatically controlling the actuators based on input from a sensor to orient the platform in a desired orientation. In an aspect, for example, the platform controller 270 may execute the level controller 274 to control the actuators 280 based on sensor input 276 to orient the platform in a desired orientation. In an example, the sensor input 276 may be an accelerometer that measures a current orientation of the body 230.

Figure 7:
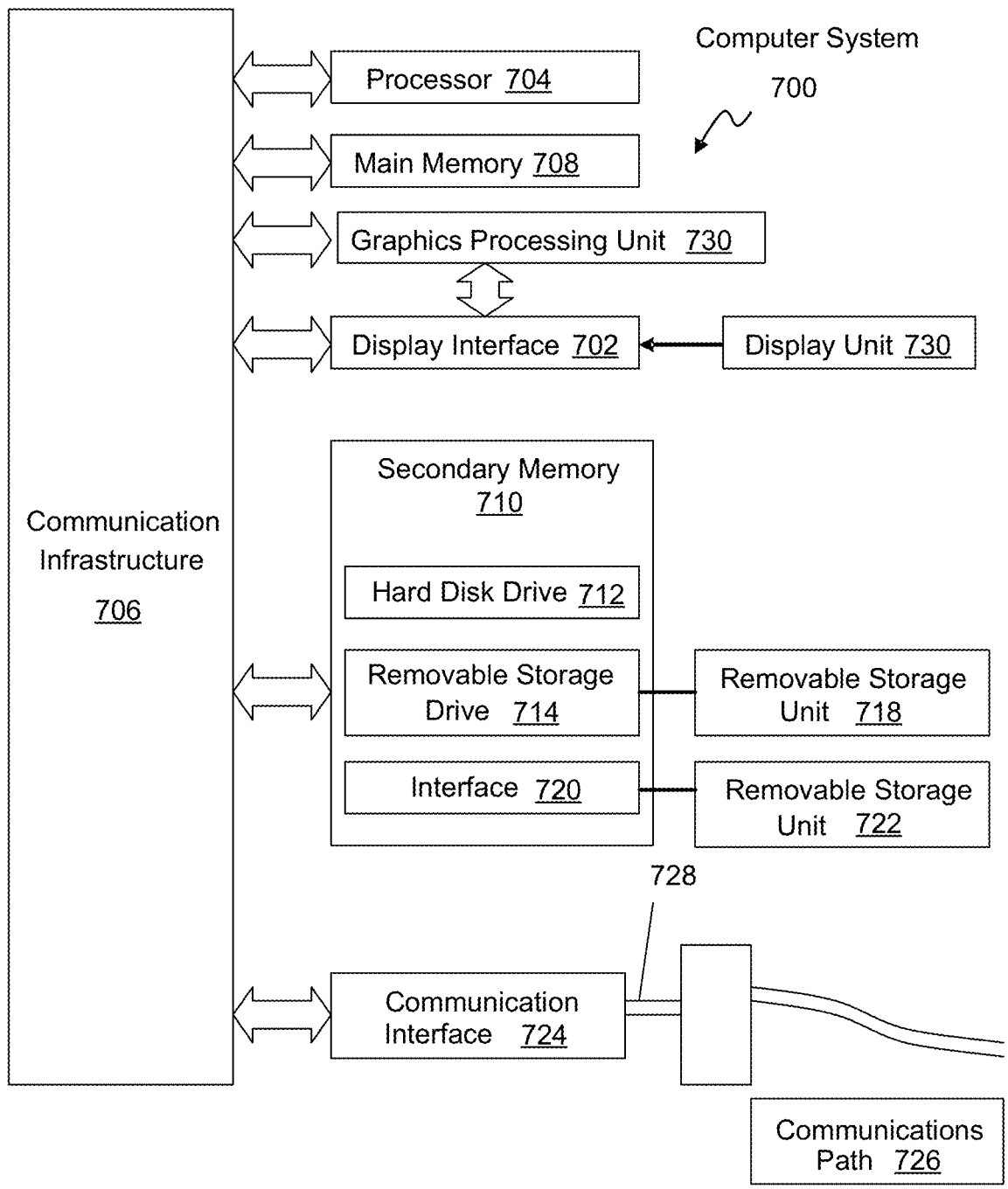
FIG. 7 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the computer system may implement the vehicle control system 160 or the platform control system 260. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard disk drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 8:
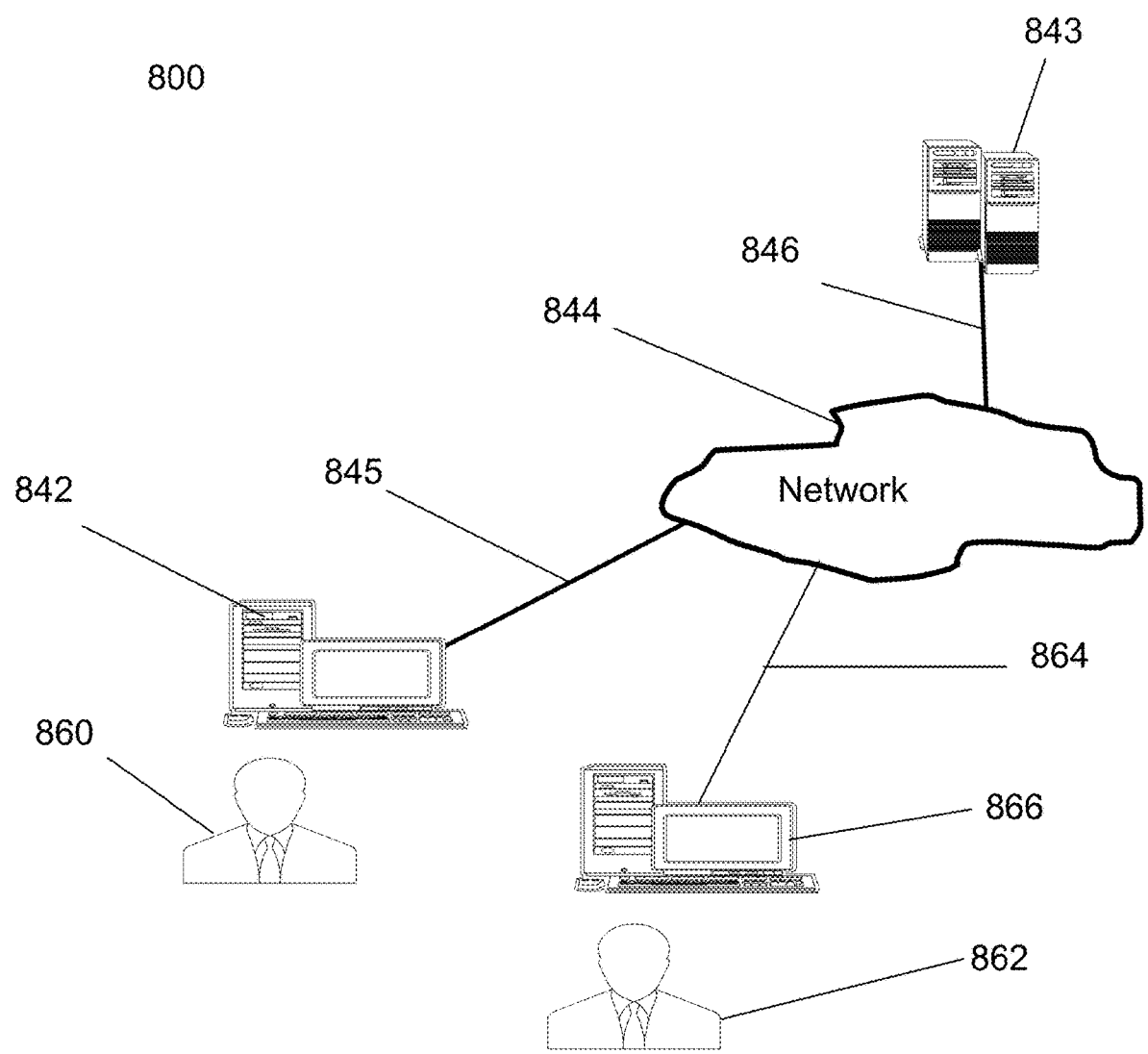
FIG. 8 is a block diagram of various exemplary system components for use in accordance with aspects of the present disclosure.

FIG. 8 is a block diagram of various example system components that may be used in accordance with aspects of the present disclosure. For example, the various components may be within the vehicle 100, or only some of the components may be within the vehicle 100, and other components may be remote from the vehicle 100. The system 800 includes one or more accessors 860, 862 (also referred to interchangeably herein as one or more "users") and one or more terminals 842, 866 (such terminals may be or include, for example, various features of the vehicle control system 160 or the platform control system 260). In one aspect, data for use in accordance with aspects of the present disclosure is, for example, input and/or accessed by accessors 860, 862 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An electric utility vehicle comprising:
   a load platform supported on a chassis including at least two electrically driven wheels; and
   a detachable platform removeably coupled to the load platform beneath the load platform, wherein the detachable platform comprises:
   a central hub including a top surface;
   three legs coupled to the central hub, each leg including
      a first actuator configured to extend the respective leg to a ground surface while the detachable platform is coupled to the load platform, wherein at least two of the three legs include a second actuator configured to pivot the respective leg horizontally away from the central hub such that the respective leg extends over a respective one of the at least two electrically driven wheels; and
   a controller configured to coordinate the first actuators and the second actuators to control an orientation of the top surface.

2. The electric utility vehicle of claim 1, wherein the top surface is expandable.

3. The electric utility vehicle of claim 2, wherein the top surface comprises a plurality of folded panels and at least one actuator configured to unfold the panels in response to an electric current.

4. The electric utility vehicle of claim 1, further comprising an electric appliance supported on the top surface, wherein the detachable platform supplies electricity to the electric appliance.

5. The electric utility vehicle of claim 1, further comprising a folding tent supported on the detachable platform.

6. The electric utility vehicle of claim 1, further comprising one or more accelerometers that determine the orientation of the detachable platform, wherein the controller is configured to periodically control one or more of the first actuators or the second actuators to bring the top surface to a desired orientation based on input from the one or more accelerometers.

7. The electric utility vehicle of claim 1, wherein the chassis includes at least two extendable legs supporting the load platform on the at least two electrically driven wheels.

8. The electric utility vehicle of claim 7, wherein the at least two electrically driven wheels include a motor located within the respective wheel.

9. The electric utility vehicle of claim 1, further comprising four legs with a respective wheel mounted to an end of each leg, each leg pivotably mounted to the chassis, wherein each leg includes a joint allowing the leg to bend to an acute angle with the respective wheel adjacent to the chassis.

10. A deployable platform comprising:
    a central hub including a top surface;
    three legs coupled to the central hub, each leg including
       a first actuator configured to extend the respective leg to a ground surface while the deployable platform is coupled to a deployment vehicle between wheels and a top surface of the deployment vehicle, wherein at least two of the three legs include a second actuator configured to pivot the respective leg horizontally away from the central hub such that the respective leg extends over a respective one of the wheels; and
    a controller configured to coordinate the first actuators and the second actuators to control an orientation of the top surface.

11. The deployable platform of claim 10, wherein the top surface is expandable.

12. The deployable platform of claim 11, wherein the top surface comprises a plurality of folded panels and at least one actuator configured to unfold the panels in response to an electric current.

13. The deployable platform of claim 10, further comprising an electric appliance supported on the top surface, wherein the deployable platform supplies electricity to the electric appliance.

14. The deployable platform of claim 10, further comprising a folding tent supported on the deployable platform.

15. The deployable platform of claim 10, further comprising one or more accelerometers that determine the orientation of the top surface, wherein the controller is configured to periodically control one or more of the first actuators or the second actuators to bring the top surface to a desired orientation based on input from the one or more accelerometers.

* * * * *